Figure 1:
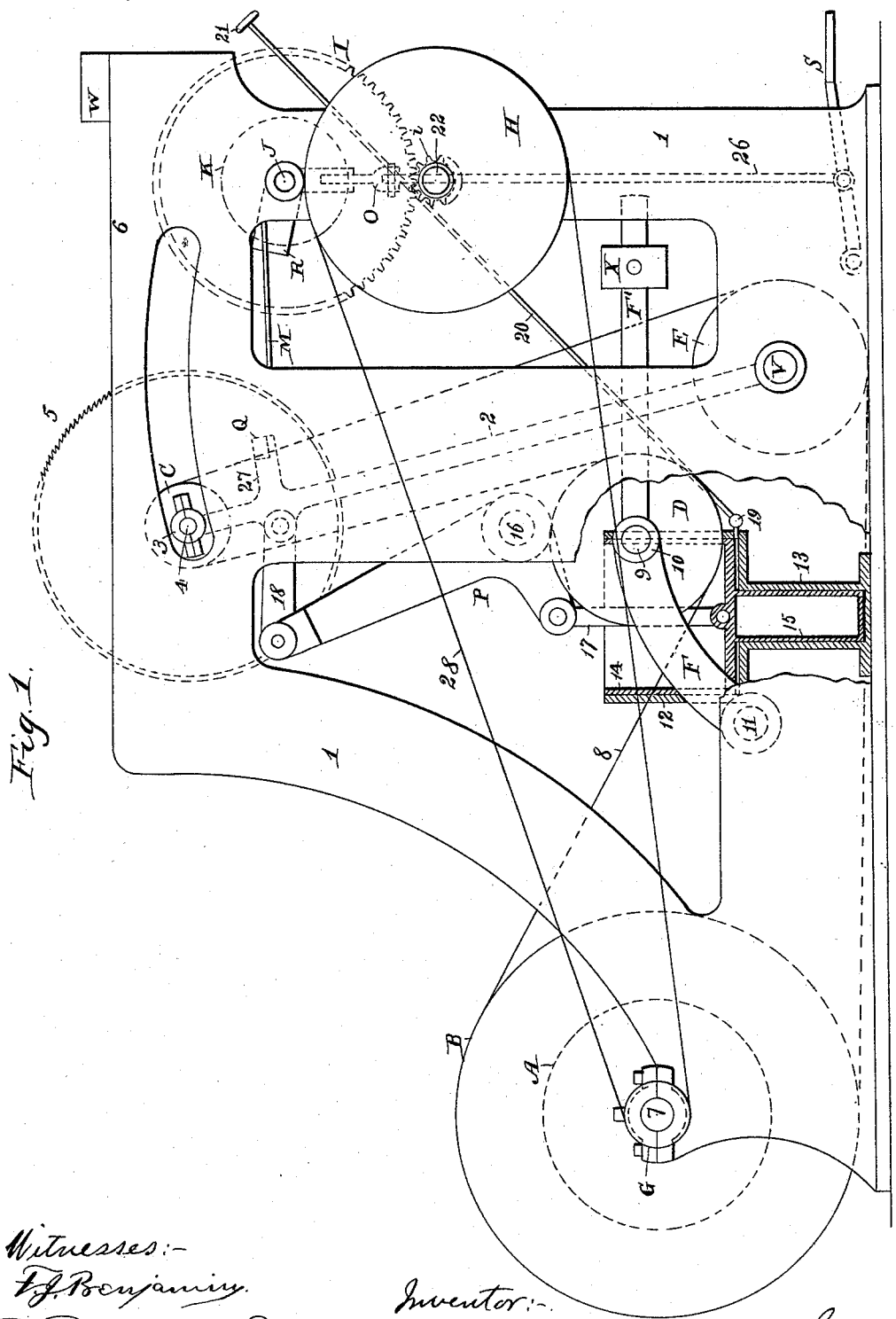

(No Model.) 3 Sheets—Sheet 1.

E. B. HAYES.
CUT-OFF SAW.

No. 477,756. Patented June 28, 1892.

Witnesses:—
F. J. Benjamin.
S. Brashears Jr.

Inventor:—
E. B. Hayes, by Smith & Low
attys.

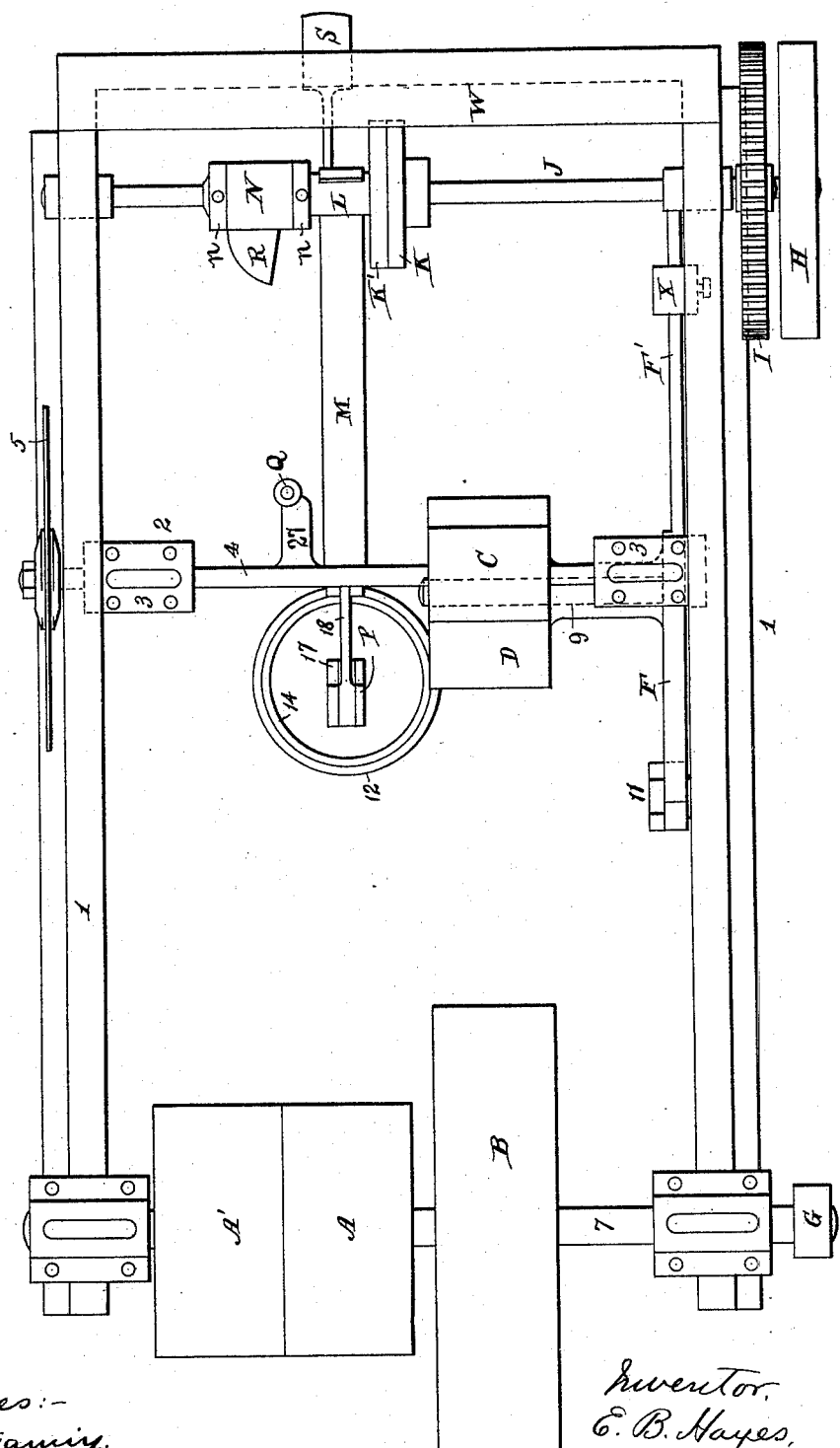

(No Model.) 3 Sheets—Sheet 3.
E. B. HAYES.
CUT-OFF SAW.
No. 477,756. Patented June 28, 1892.
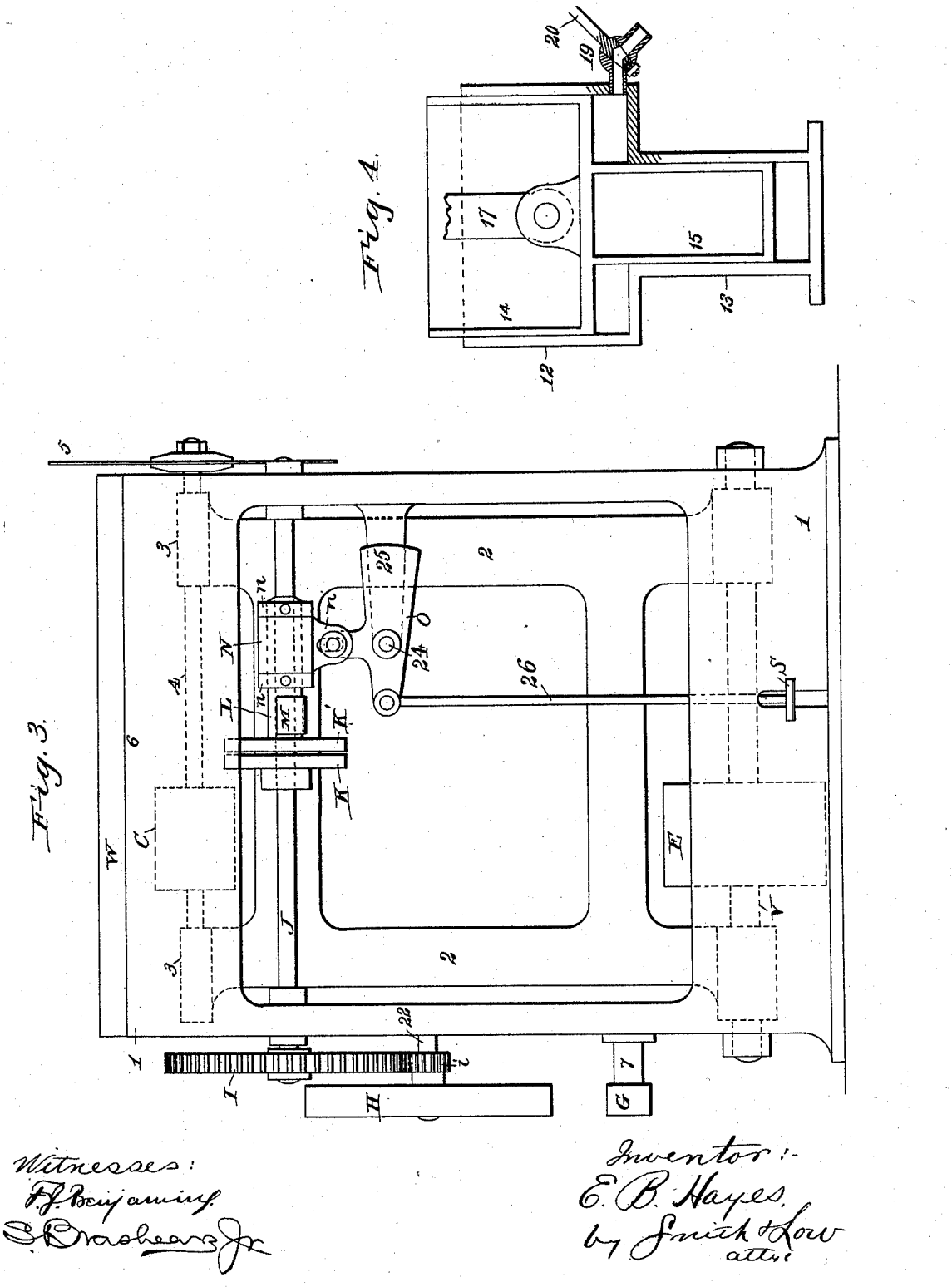

UNITED STATES PATENT OFFICE.

ELI B. HAYES, OF OSHKOSH, WISCONSIN.

CUT-OFF SAW.

SPECIFICATION forming part of Letters Patent No. 477,756, dated June 28, 1892.

Application filed September 7, 1891. Serial No. 405,008. (No model.)

*To all whom it may concern:*

Be it known that I, ELI B. HAYES, a citizen of the United States, residing at Oshkosh, in the county of Winnebago and State of Wisconsin, have invented certain new and useful Improvements in Cut-Off Saws; and I do declare the following to be a full, clear, and exact description of the invention, such as will enable others skilled in the art to which it appertains to make and use the same.

My invention relates to that class of cut-off saws in which the saw while in motion is moved toward and from the table or lumber-rest and the wood to be operated upon, cutting off a piece of the latter at each movement, the lumber being fed to and along said table or rest by hand or any suitable mechanical means.

It is the object of the improvement to simplify the means for so moving and controlling the saw and render the same more effective and easier of operation. In cutting off wide stuff the movement of the saw must be of considerable extent, while in operating upon narrow strips a small fraction of such movement is sufficient and saves time and power. These saws are usually or often used for cutting up miscellaneous lumber of all sizes and widths, and it is important that the operator have the saw under full and ready control as to its extent of movement, and my invention is in part directed to an improved means for this purpose.

With such objects in view my invention consists in the parts and combinations thereof hereinafter set forth and finally claimed.

In order to make my invention more clearly understood, I have shown in the accompanying drawings means for carrying it into practical effect, without, however, intending to limit it to the particular construction which, for the sake of illustration, I have delineated.

In said drawings, Figure 1 is a side view of a cut-off saw and actuating and controlling mechanism embodying my improvements. Fig. 2 is a plan view of the same with the work table or rest removed. Fig. 3 is a front view. Fig. 4 is a detail view showing the dash-pot in section on a larger scale.

Referring to the drawings, 1 1 indicate the main frame of the machine, in or on which is mounted a movable frame or support 2, which carries in bearings 3 the shaft 4. On the latter is mounted the circular saw 5, which extends a proper distance above the work-table 6, as seen in Fig. 1.

W is a rest upon the work-table, against which the lumber to be cut is held with the portion which is to be cut off projecting past the saw. This operation is performed by moving the support 2 toward the rest W, carrying with it the rotating saw. The support 2 may consist of a hinged frame mounted upon the shaft V or on trunnions concentric with this shaft.

7 is the main shaft, having fast and loose driven pulleys A A' and driving-pulleys B and G.

8 is a belt connecting the pulley B with the pulley C on the saw-shaft 4, this belt being also carried around a pulley E upon the shaft V and a movable tightening-pulley D, mounted upon a shaft 9, which latter is carried in the bearing 10 of a frame F. The latter is mounted and is adapted to oscillate upon a pivot-stud 11, secured in the frame 1, and has an extended arm F', provided with an adjustable weight X, by which the tension of the belt 8 may be regulated. This arrangement permits the driving of the saw 5 without interfering with the free movement of the support 2 on its shaft V.

12 and 13 are open-ended chambers or cylinders, which together may be termed a "double" cylinder. The cylinder 13 is of smaller diameter than the cylinder 12 and is shown as arranged in line with the latter and as formed integral therewith. 14 and 15 are the pistons adapted to fit these cylinders and shown as connected and adapted to move together. Said pistons and cylinders are connected the one to a fixed object—such as the base of the frame 1—and the other to the saw-support 2, and constitute a vacuum device adapted to control the movement of the saw with its support. I prefer to attach the cylinders to the fixed base, and to connect the pistons with said support by means of the angle-lever P, pivoted at 16 upon the frame 1, one arm of which lever is connected by the link 17 with the pistons and the other arm of which is connected by the link 18 with the support 2.

19 is a valve, which when open affords a communication between the interior of the cylinder 12 and the atmosphere. This valve is operated by a shaft or rod 20, which extends to within convenient reach of the person who is running the machine and is there provided with a handle or hand-wheel 21. When the saw and support 2 are in their most retracted position, as seen in Fig. 1, the piston 15 will entirely fill the cylinder 13, and the movement of the support 2 toward the lumber will raise the piston 15 and form a vacuum in its cylinder. As soon as the support 2 is released by the means which causes such forward movement, the vacuum in the cylinder 13 will act with great force to retract the support 2 to its original position. This return movement is not, however, accompanied by any blow or shock, by reason of a certain amount of air which occupies the cylinder 12 beneath the piston 14. The amount of this air and the facility of its escape from the cylinder 12 will determine the amount of the resistance which the air-cushion will afford to the return of the support 2. By a momentary manipulation of the hand-wheel 21 the operator can so regulate the valve 19 that the saw will oscillate toward and from the work-table in long sweeps, or will move rapidly in a very short arc. He is thus enabled to cut wide lumber or to cut narrow strips with rapidity and economy of power, changing from one to the other without loss of time and without shock to the machinery.

I will now describe the means by which the saw with its support are moved toward the work-table.

J is a power-shaft mounted in the frame 1 and provided with a driven gear I. The latter is engaged and operated by a pinion $i$ on a stud-shaft 22, which carries a pulley H, connected by a belt 28 with the pulley G. By these devices the shaft J is caused to rotate continuously.

K is a friction disk or wheel secured upon the shaft J and adapted to be engaged by a corresponding wheel K', carried by a sleeve or drum L, which revolves freely on and is longitudinally movable upon the shaft J.

N is a loose collar surrounding the sleeve L and held between fixed collars $n$. It is provided with a depending lug $n'$, to which is loosely pivoted the vertical arm of an angle-lever O, which is pivotally mounted at 24 on the frame 1. This angle-lever is provided with a counter-balance 25, which normally holds the wheel K' out of engagement with the wheel K, and its horizontal arm is connected by a rod 26 with a treadle S, which also is sustained by the counter-balance 25.

M is a belt attached to the support 2 and sleeve L and adapted to be wound up on the latter whenever the friction-wheels are in engagement. The operator, having placed a piece of lumber which is to be sawed against the rest W, depresses the treadle S, causing the friction-wheel K' to be forced against the wheel K by the operation of the device just described. The sleeve L is immediately caused to partake of the rotary movement of the shaft J, winds up the belt M, and causes the rotating saw to approach and cut through the lumber.

R is a projection or cam formed with or attached to the collar N or otherwise suitably connect with the sleeve L. This projection is adapted to be engaged at the instant that the saw has finished its cut by a corresponding part or projection of the frame 2. Such a projection is furnished by a roller Q, mounted on a bracket-arm 27 and situated in line with the projection R. At the end of the forward movement of the saw the roller Q strikes the side of the cam R, forces the sleeve L, with its wheel K', away from the wheel K and releases the frame 2 from the means which moves it. Said frame immediately flies back under the force of the vacuum in the cylinder 13 and is cushioned and controlled as to the distance to which it is retracted by the air in the cylinder 12, as already described.

What I claim is—

1. In a cut-off saw, the combination, with the saw proper and a movable frame or support therefor, of mechanism for actuating the saw, a vacuum device connecting said support with a relatively fixed object for controlling the movement of the saw, and means independent of said vacuum device for moving said support with the saw, substantially as set forth.

2. In a cut-off saw, the combination, with the saw proper and a movable frame or support therefor, of mechanism for actuating the saw, means for moving said support with the saw, and a double cylinder and piston connecting said support with a relatively fixed object for controlling the movement of the saw, substantially as set forth.

3. In a cut-off saw, the combination of the saw proper, a movable support therefor, mechanism for actuating the saw, means for moving said support with the saw, and a controlling device for said support, consisting of large and small cylinders and pistons fitting the same, substantially as set forth.

4. In a cut-off saw, the combination of the saw proper, a movable support therefor, mechanism for actuating the saw, a vacuum cylinder and piston interposed between said support and a relatively fixed object and adapted to arrest the backward movement of the support, a valve for controlling the communication of the cylinder with the atmosphere and means for operating said valve, and means independent of said cylinder and piston for moving said support with the saw, substantially as set forth.

5. In a cut-off saw, the combination of the saw proper, a movable support therefor, mechanism for actuating the saw, means for moving said support with the saw, and a controlling device for said support, consisting of large and small cylinders and pistons fitting the same, the larger cylinder having a communication with the atmosphere, and a valve for controlling the same, substantially as set forth.

6. In a cut-off saw, the combination of the saw proper and its shaft, a movable support for the same, means for retracting the support, a friction-wheel K', connected with said support, a power-shaft parallel with the saw-shaft, a friction-wheel K on the power-shaft and adapted to engage the wheel K', one of said wheels being movable longitudinally and having connected with it a cam or projection, and a projection carried by said support and adapted to engage the first projection and disconnect said wheels, substantially as set forth.

7. The combination, with the saw-support 2, of the cylinders 12 and 13, with their pistons, the valve 19 and actuating-rod 20, the lever P, connected with said pistons and with the frame 2, and means for operating the saw and advancing its support, substantially as set forth.

8. The combination, with the saw-support 2, of the shaft J, the friction-wheel K thereon, the sleeve L and wheel K', connected with said support, the collar N, having a projection R, the lever O, connected with said sleeve, means for forcing the friction-wheels together, and the projection Q on the saw-support, substantially as set forth.

In testimony whereof I affix my signature in the presence of two witnesses.

ELI B. HAYES.

Witnesses:
F. C. STEWART,
THOS. E. ALLEN.